(12) United States Patent
Jeng et al.

(10) Patent No.: US 7,973,890 B2
(45) Date of Patent: Jul. 5, 2011

(54) OPTICAL COMPENSATION FILM AND LIQUID CRYSTAL DISPLAY PANEL USING THE SAME

(75) Inventors: Yue-Shih Jeng, Hsinchu (TW); Zeng-De Chen, Hsinchu (TW); Kuan-Yi Hsu, Hsinchu (TW); Chih-Ming Chang, Hsinchu (TW); Feng-Yuan Gan, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 418 days.

(21) Appl. No.: 11/840,993

(22) Filed: Aug. 19, 2007

(65) Prior Publication Data

US 2008/0273149 A1 Nov. 6, 2008

(30) Foreign Application Priority Data

May 4, 2007 (TW) .............................. 96115834 A

(51) Int. Cl.
*G02F 1/1335* (2006.01)

(52) U.S. Cl. .................... 349/114; 349/117; 349/119

(58) Field of Classification Search .................. None
See application file for complete search history.

(56) References Cited

U.S. PATENT DOCUMENTS

| | | | |
|---|---|---|---|
| 6,731,360 B2 * | 5/2004 | Roosendaal et al. | 349/113 |
| 7,088,409 B2 | 8/2006 | Itou et al. | |
| 7,169,447 B2 | 1/2007 | Su Yu et al. | |
| 7,339,643 B2 * | 3/2008 | Roosendaal et al. | 349/117 |
| 2006/0044498 A1 * | 3/2006 | Lee et al. | 349/117 |
| 2006/0177605 A1 | 8/2006 | Lub et al. | |
| 2006/0187388 A1 * | 8/2006 | Ohyama et al. | 349/114 |
| 2006/0193999 A1 | 8/2006 | Verall et al. | |
| 2007/0211198 A1 * | 9/2007 | Nagai et al. | 349/114 |

FOREIGN PATENT DOCUMENTS

| | | |
|---|---|---|
| CN | 1617035 | 5/2005 |
| CN | 1916703 | 2/2007 |
| JP | 2005141110 | 6/2005 |
| TW | I276850 | 3/2007 |
| WO | WO2006/010431 | 2/2006 |

* cited by examiner

*Primary Examiner* — Tina M Wong
(74) *Attorney, Agent, or Firm* — Jinq Chyun IP Office

(57) ABSTRACT

An optical compensation film includes an optical film and a retardation film. The optical film provides a plate retardation in the direction of thickness (Rth), while the retardation film is disposed on the optical film. The retardation film includes first retarders and second retarders, wherein the first retarders are disposed on at least partial areas of the optical film and provide a first planar retardation (Ro1); the second retarders are disposed on partial areas of the optical film but outside the first retarders and provide a second planar retardation (Ro2) and the first planar retardation (Ro1) is different from the second planar retardation (Ro2). The above-mentioned optical compensation film is capable of compensating the displays for different display areas in a liquid crystal display panel. In addition, the present invention also provides a fabricating method of optical compensation film.

13 Claims, 8 Drawing Sheets

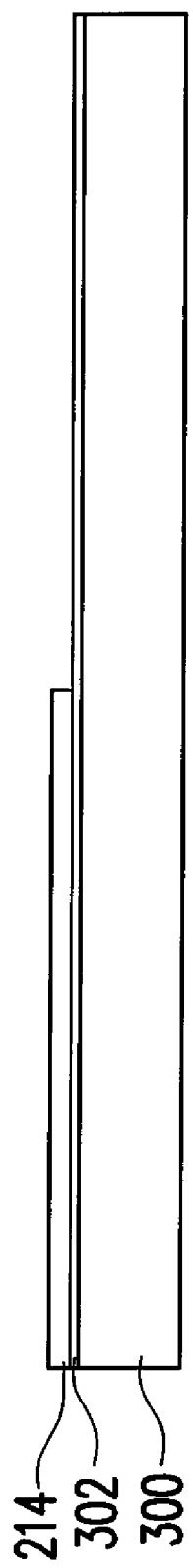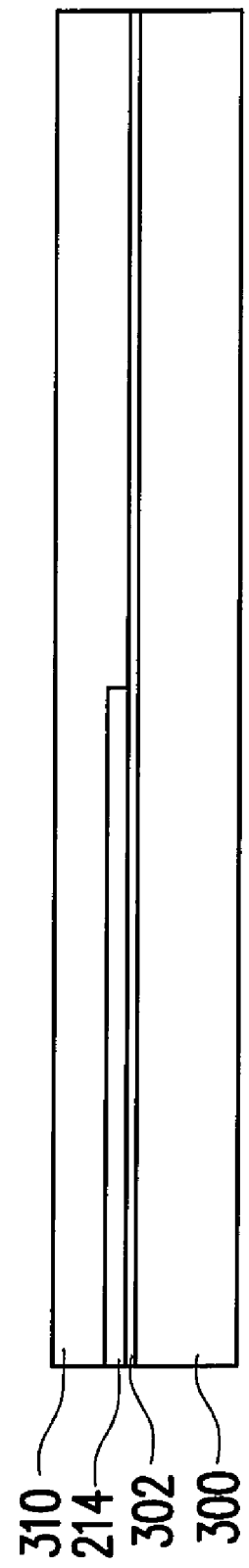

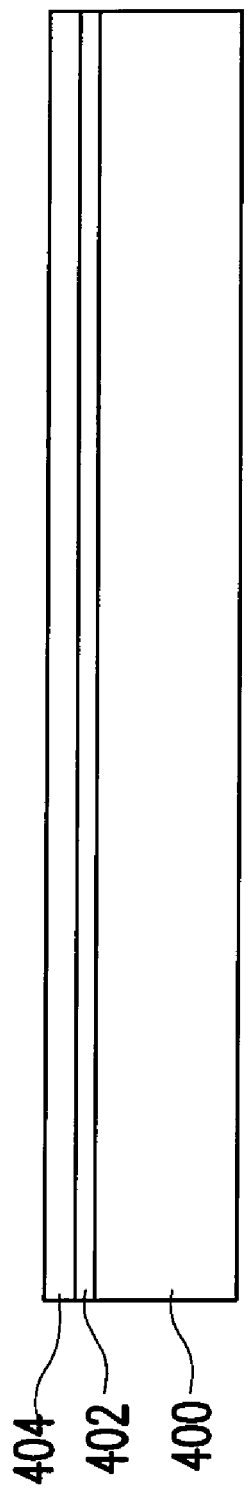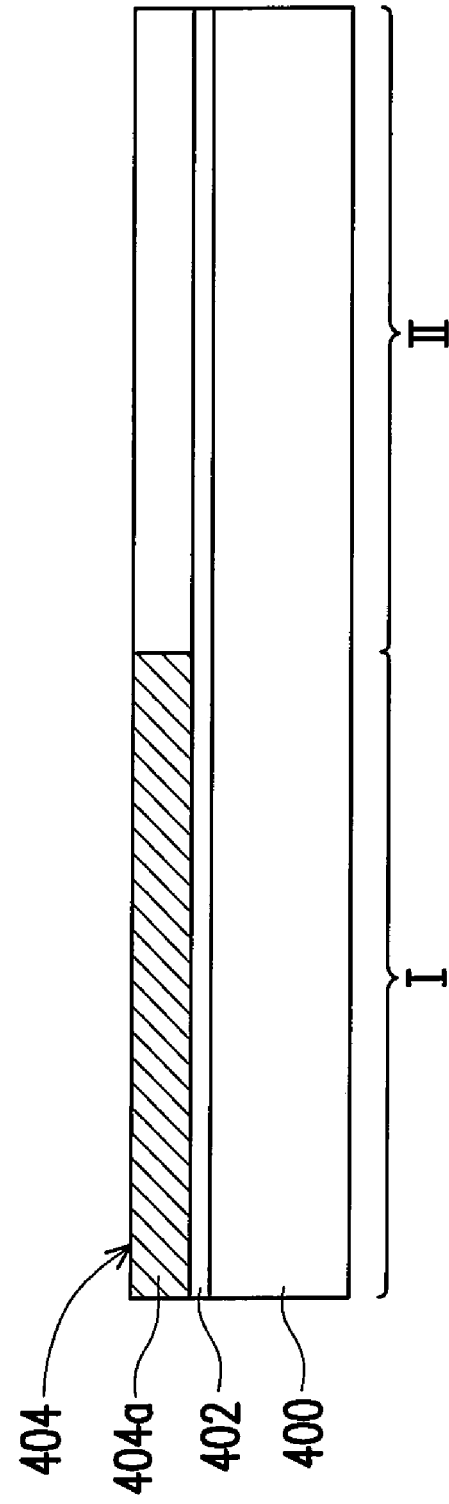

OPTICAL COMPENSATION FILM AND LIQUID CRYSTAL DISPLAY PANEL USING THE SAME

CROSS-REFERENCE TO RELATED APPLICATION

This application claims the priority benefit of Taiwan application serial no. 96115834, filed May 4, 2007. All disclosure of the Taiwan application is incorporated herein by reference.

BACKGROUND OF THE INVENTION

1. Field of the Invention

The present invention generally relates to an optical compensation film, and more particularly, to an optical compensation film capable of providing different optical compensation effects on different areas of a liquid crystal display panel (LCD panel).

2. Description of Related Art

An LCD is not a self-luminescent display, therefore, an external light source is needed to provide the LCD with sufficient luminance. According to different light sources, LCDs can be divided into transmissive LCDs, transflective LCDs and reflective LCDs, wherein the transflective LCDs simultaneously using a backlight source and environmental light are suitable for portable products, such as handset, personal digital assistant (PDA) and e-book, and dominants the market.

In a conventional transflective LCD, usually an upper polarizer and a lower polarizer are disposed on the external surfaces of the LCD to achieve better display performance. In addition, in order to enhance the display performance of a transflective LCD, a plurality of optical films, for example negative C-plate or λ/4 plate, can be employed and disposed between the upper polarizer and the lower polarizer for optical compensation. However, the above-mentioned method requires laminating and pasting the plurality of optical films, which makes the overall thickness of an LCD significantly increased.

SUMMARY OF THE INVENTION

Accordingly, the present invention is directed to provide an optical compensation film capable of providing different compensation effects for different areas.

The present invention is also directed to provide an LCD panel to integrate an optical compensation film therein to simultaneously compensate the contrast ratio of the transmissive areas and the brightness of the reflective areas of the LCD panel.

The present invention is also directed to provide a fabricating method of an optical compensation film, which is able to form a plurality of areas with different optical compensation effects in the same or single optical compensation film.

The present invention provides an optical compensation film including an optical film and a retardation film. The optical film provides a plate retardation in the direction of thickness, while the retardation film is disposed on the optical film. The retardation film includes a first retarder and a second retarder, wherein the first retarder is disposed on at least one area of the optical film and provides a first planar retardation (Ro1), the second retarder is disposed on another area of the optical film but outside the first retarder and provides a second planar retardation (Ro2), and the first planar retardation (Ro1) is different from the second planar retardation (Ro2).

The present invention also provides an LCD panel, which includes a first substrate, a second substrate and a liquid crystal layer. The first substrate includes a plurality of transflective pixel structures arranged in array, and each transflective pixel structure has a transmissive area and a reflective area. The second substrate is located over the transflective pixel structures arranged in array of the first substrate and has an optical compensation film, wherein the optical compensation film includes an optical film and a retardation film. The optical film provides a plate retardation in the direction of thickness (Rth), while the retardation film is located between the optical film and the second substrate. The retardation film includes a first retarder and a second retarder, wherein the first retarder is located on the reflective areas of the transflective pixel structures arranged in array and provides a first planar retardation (Ro1); the second retarder is located at least overlapping the transmissive areas of the transflective pixel structures arranged in array and provides a second planar retardation (Ro2). A material of the retardation film may be intrinsically even liquid crystal material. The first planar retardation (Ro1) is different from the second planar retardation (Ro2). In addition, the liquid crystal layer is disposed between the transflective pixel structures arranged in array of the first substrate and the optical compensation film of the second substrate.

In an embodiment of the present invention, the above-mentioned plate retardation in the direction of thickness (Rth) ranges approximately from 130 nm±6 nm to 220 nm±6 nm.

In an embodiment of the present invention, the above-mentioned first planar retardation (Ro1) ranges approximately from 120 nm±3 nm to 160 nm±3 nm and the above-mentioned second planar retardation (Ro2) ranges approximately from 0 nm to 10 nm.

In an embodiment of the present invention, the above-mentioned optical film is a negative C-plate.

In an embodiment of the present invention, the material of the above-mentioned optical film includes liquid crystal material.

In an embodiment of the present invention, the material of the above-mentioned retardation film includes liquid crystal material. In addition, the above-mentioned retardation film further includes an alignment-defining layer located over at least partial areas of the optical film and the alignment-defining layer adjusts the liquid crystal material located between the alignment-defining layer and the optical film to provide the second planar retardation (Ro2) such that the second retarder is formed. The thickness of the alignment-defining layer ranges approximately from 0.05 μm to 0.3 μm.

In an embodiment of the present invention, the above-mentioned optical compensation film further includes a protection layer disposed between the retardation film and the optical film.

In an embodiment of the present invention, the above-mentioned optical compensation film further includes a λ/2 retardation film, wherein the retardation film is located, for example, between the λ/2 retardation film and the optical film.

The present invention also provides a fabricating method of optical compensation film. First, a substrate is provided. Next, a material layer is formed on the substrate. Then, the material layer is cured to form a retardation film. The retardation film includes a plurality of first retarders and a plurality of second retarders, wherein the first retarder provides a first planar retardation (Ro1), the second retarder provides a second planar retardation (Ro2) and the first planar retardation (Ro1) is different from the second planar retardation (Ro2).

In an embodiment of the present invention, the above-mentioned method of forming the liquid crystal material includes slot-die coating or spin coating.

In an embodiment of the present invention, the above-mentioned first temperature ranges approximately from 50° C. to 150° C.

In an embodiment of the present invention, the step of curing the above-mentioned material layer includes performing another photo-curing process in a second temperature and the second temperature is approximately, for example, between 20° C. and 90° C.

The present invention further provides an LCD panel, which includes a first substrate, a second substrate and a liquid crystal layer. The first substrate includes a plurality of transflective pixel structures arranged in array, and each transflective pixel structure arranged in array has a transmissive area and a reflective area. The second substrate is located over the transflective pixel structures arranged in array of the first substrate and includes a retardation film. The retardation film includes a plurality of first retarders and a plurality of second retarders, wherein the first retarders are located at least overlapping the reflective areas of the transflective pixel structures arranged in array and provide a first planar retardation (Ro1), the second retarders are located at least overlapping the transmissive areas of the transflective pixel structures arranged in array and provide a second planar retardation (Ro2), the material of the retardation film includes liquid crystal material, and the liquid crystal molecules in the first retarders and the second retarders have different orientations to make the first planar retardation (Ro1) different from the second planar retardation (Ro2). In addition, the liquid crystal layer is disposed between the transflective pixel structures arranged in array of the first substrate and the optical compensation film of the second substrate.

Within the optical compensation film of the present invention, the retardation film at different areas provides different planar retardations, so that the planar retardation of the transmissive areas in the LCD panel is approximately zero, while the planar retardation of the reflective areas is approximately equal to $\lambda/4$. In this way, the retardation film not only increases the brightness of the reflective areas, but also does not affect the contrast ratio of the transmissive areas. Meanwhile, the optical film in the optical compensation film of the present invention can provide a retardation which is helpful to further enhance the contrast ratio of the transmissive areas. Besides, the fabricating method of optical compensation film of the present invention can be integrated into an LCD panel fabrication process, which is able to avoid the thickness of an LCD from being significantly increased due to laminating and pasting the plurality of optical compensation films.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3A-3D are diagrams showing the fabricating method of an optical compensation film 210 of the present invention.

FIGS. 4A-4C are diagrams showing the fabricating method of optical compensation film according to another embodiment of the present invention.

DESCRIPTION OF THE EMBODIMENTS

Figure 1A:
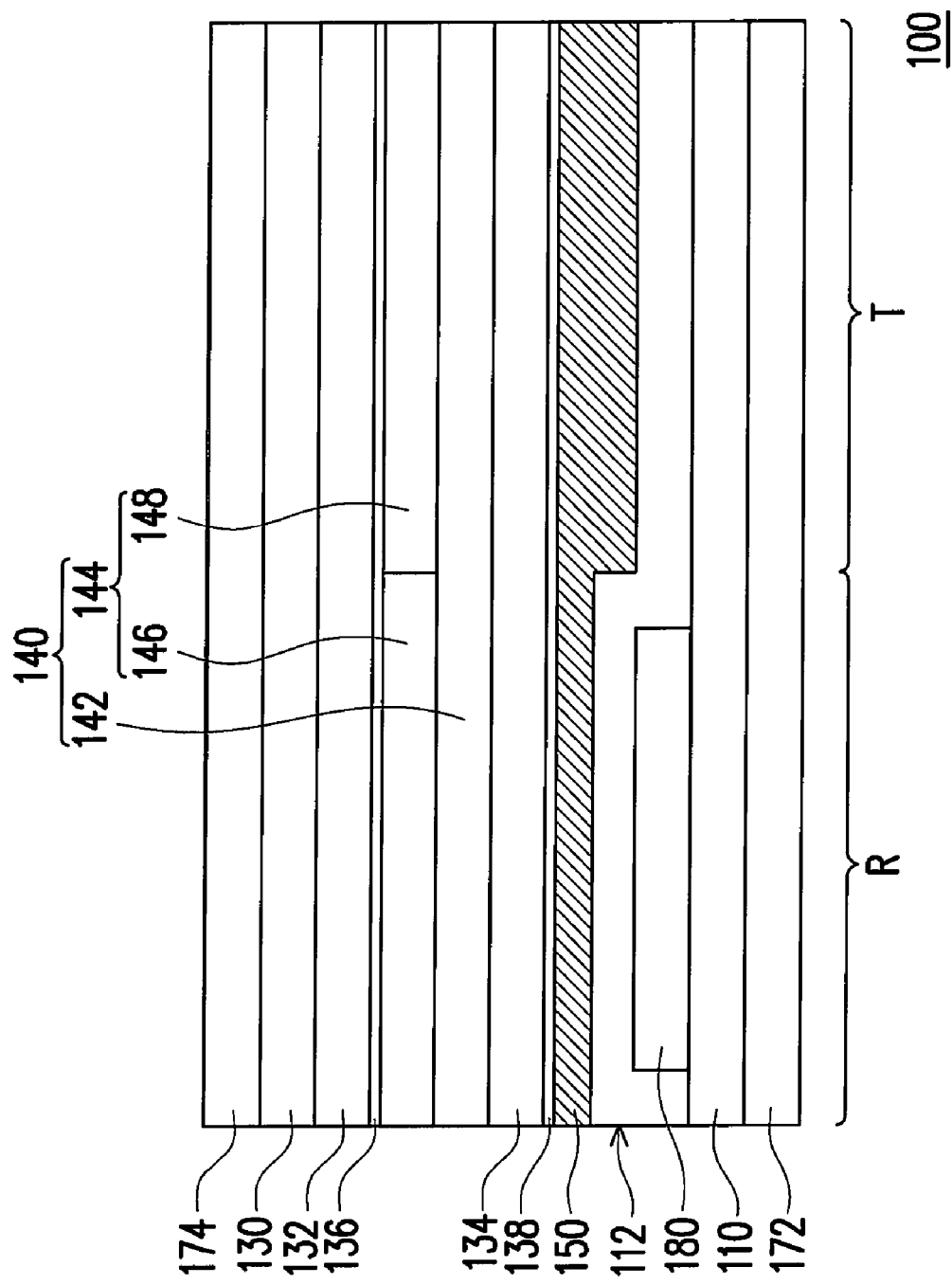
FIG. 1A is a diagram of an LCD panel according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In order to optimize the display quality of a transflective LCD, transmissive areas and reflective areas of the transflective LCD panel respectively require different optical films with different compensation effects; the optical films with the same compensation effects are incompetent for simultaneously enhancing the display quality of transmissive areas and reflective areas to the optimal extent, wherein only a compromise result between display quality of the transmissive areas and that of the reflective areas can be obtained. For example, to enhance the brightness of reflective areas, a $\lambda/4$ plate can be employed and disposed between the upper polarizer and the LCD panel. Meanwhile, another $\lambda/4$ plate is employed and disposed between the lower polarizer and the LCD panel so as to make the transmissive areas display normally. Thus, the scheme not only fails to reduce the overall thickness of the LCD panel, but also significantly lowers the contrast ratio of the transmissive areas due to a multi-films design. It is important to simultaneously optimize the contrast ratio of the transmissive areas and the brightness of the reflective areas.

FIG. 1A is a diagram of an LCD panel according to an embodiment of the present invention. Referring to FIG. 1A, an LCD panel 100 of the embodiment includes a first substrate 110, a second substrate 130 and a liquid crystal layer 150. The first substrate 110 includes a plurality of transflective pixel structures 112 arranged in array (only one of the transflective pixel structures 112 is shown in FIG. 1A), and each transflective pixel structure 112 arranged in array has a transmissive area T and a reflective area R. The second substrate 130 is located over the transflective pixel structures 112 arranged in array of the first substrate 110 and has an optical compensation film 140, wherein the optical compensation film 140 includes an optical film 142 and a retardation film 144. In addition, the liquid crystal layer 150 is disposed between the transflective pixel structures 112 arranged in array of the first substrate 110 and the optical compensation film 140 of the second substrate 130.

In the optical compensation film 140 of the embodiment, the retardation film 144 located between the optical film 142 and the second substrate 130 includes a first retarder 146 and a second retarder 148, and the retardation film 144 can be an integrated single-layer structure. The first retarder 146 is located on the reflective areas R of the transflective pixel structures 112 arranged in array and provides a first planar retardation (Ro1); the second retarder 148 is located on the transmissive areas T of the transflective pixel structures 112 arranged in array and provides a second planar retardation (Ro2). The first planar retardation (Ro1) is different from the second planar retardation (Ro2). Meanwhile the optical film 142 provides a plate retardation in the direction of thickness (Rth).

For example, the plate retardation (Rth) of the optical film 142 is approximately between 130 nm±6 nm and 220 nm±6 nm, the first planar retardation (Ro1) provided by the first retarder 146 is approximately from 120 nm±3 nm to 160 nm±3 nm, or preferably approximately from 120 nm±3 nm to 140 nm±3 nm, and the second planar retardation (Ro2) provided by the second retarder 148 is approximately from 0 nm to 10 nm.

A lower polarizer 172 and an upper polarizer 174 can be respectively attached on the external surfaces of the LCD panel 100. During displaying of the LCD panel 100, the first planar retardation (Ro1) in the reflective areas R (e.g. from 120 nm±3 nm to 160 nm±3 nm) provided by the retardation film 144 of the optical compensation film 140 allows the linear polarized light passing through the upper polarizer 174 to be converted into a circular polarized light entering the liquid crystal layer 150. In comparison with linear polarized light, the circular polarized light is advantageous, since the components of the circular polarized light in every polarized direction are substantially the same. Thus, when circular polarized light passes through the liquid crystal layer 150 in the reflective areas R and then is reflected, the light is more effectively utilized. When the reflected back circular polarized light passing through the retardation film 144 again would be converted into linear polarized light, which passes through the upper polarizer 174 for displaying images. In other words, the compensation provided by the optical compensation film 140 is helpful to enhance the brightness of the reflective areas R.

In addition, the second planar retardation (Ro2) provided by the retardation film 144 of the optical compensation film 140 in the transmissive areas T is about zero. At the time, the light provided by a backlight source, after passing through the lower polarizer 172, the liquid crystal layer 150 and the optical compensation film 140, would keep the original linear polarization characteristic. Thus, there is no need to dispose another second layer of retardation film on the first substrate 110 in the LCD panel 100, and the display performance of the transmissive areas T is not affected by the multi-films design.

Figure 1B:
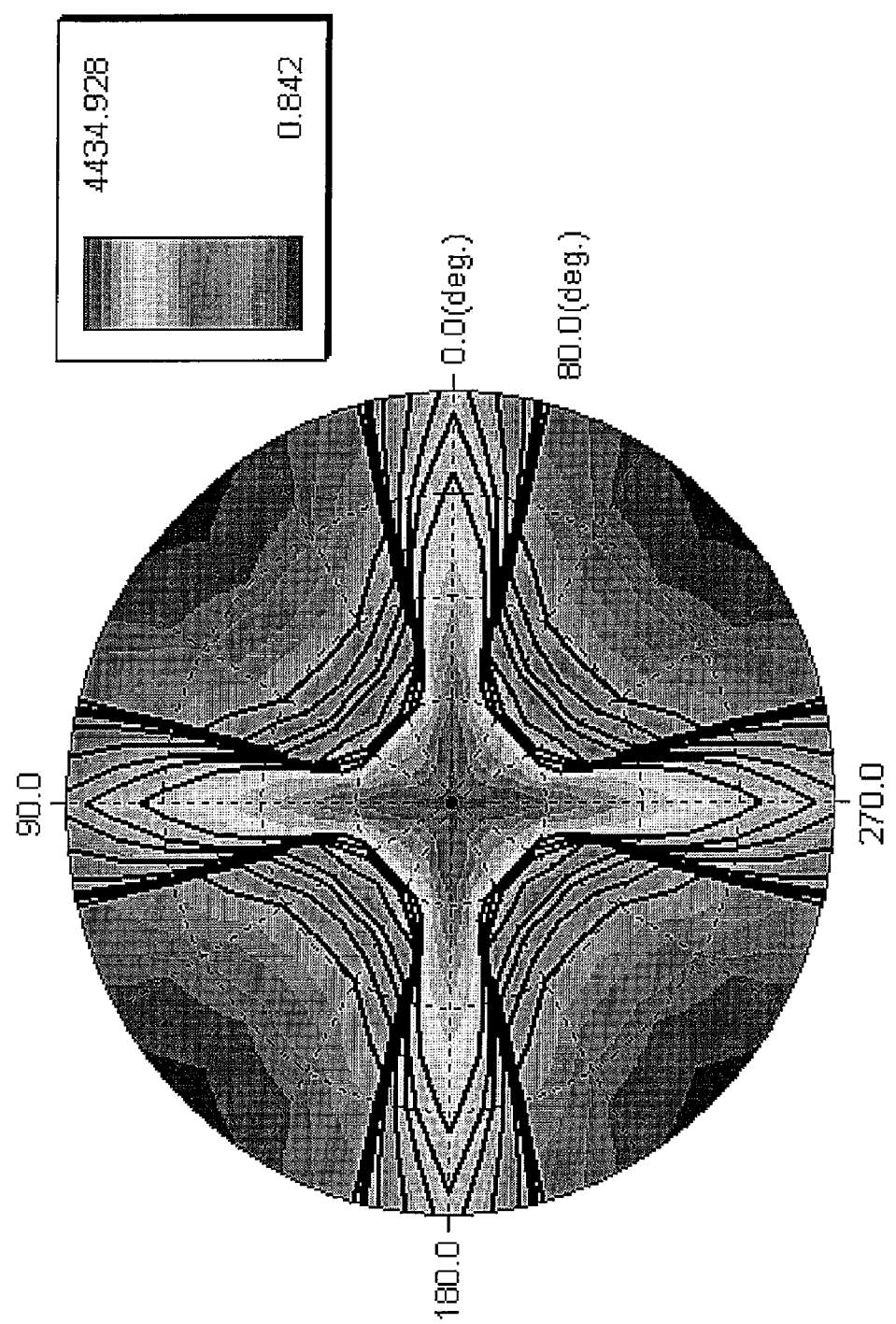
FIG. 1B shows the contrast ratio of the transmissive areas T of the LCD panel 100.

Besides, the liquid crystal molecules in the liquid crystal layer 150 of the LCD panel 100 has intrinsically optical anisotropy which may affect the display performance of the LCD panel 100; thus, for example, a first negative C-plate is disposed in the optical compensation film 140 and serves as the optical film 142 to compensate a phase retardation or reduce leakage light caused by the optical anisotropy of the liquid crystal molecules. By a practical measurement, the image contrast ratio for a conventional LCD panel where various optical films are attached for optical compensation is about 4300. In the same measuring conditions, the contrast ratio of the transmissive areas T in the LCD panel 100 of the present invention is shown in FIG. 1B. As shown in FIG. 1B, the contrast ratio for the transmissive areas T of the LCD panel 100 is about 4434, which is much greater than that of the conventional design. In general speaking, the transmissive areas T of the LCD panel 100 of the embodiment has good contrast ratio and the reflective areas thereof has higher brightness.

In more detail, the optical film 142 and the retardation film 144 in the optical compensation film 140 are, for example, respectively constituted by intrinsically even materials, and the materials of the optical film 142 and the retardation film 144 include liquid crystal material. The optical behavior of liquid crystal material can be adjusted by changing the thickness of the liquid crystal material or the orientation of the liquid crystal molecules. Thus, in the optical compensation film 140, different compensation effects can be achieved by, for example, making the liquid crystal molecule orientation in the first retarder 146 of the retardation film 144 different from that in the second retarder 148 without altering other material parameters (for example, material composition, componential concentration, doped or not). In this way, the first retarder 146 and the second retarder 148 have different planar retardations. For example, the present invention is able to adjust the liquid crystal molecule orientations for different areas to fabricate the retardation film 144 by using various contact alignment processes or non-contact alignment processes.

The LCD panel 100 can further include a common electrode 134 disposed on the second substrate 130, wherein the common electrode 134 is located between the liquid crystal layer 150 and the optical compensation film 140. Meanwhile, the LCD panel 100 further includes a color filter film 132 disposed between the optical compensation film 140 and the second substrate 130 for full-color display. In other embodiments, a color filter on array (COA) design can be used, by which the color filter film 132 is disposed on the first substrate 110. Note that if the color filter film 132 is disposed between the optical compensation film 140 and the second substrate 130, an additional first alignment layer 136 can be used and disposed between the color filter film 132 and the retardation film 144 for adjusting the orientation of the liquid crystal molecules of the liquid crystal layer 150.

The LCD panel 100 is a transflective LCD panel, thus, a plurality of optical modulation layers 180 can be disposed in the LCD panel 100 to form dual cell gaps. As shown by FIG. 1A, the optical modulation layers 180 can be disposed between the liquid crystal layer 150 and the first substrate 110 and located at least overlapping or totally within the reflective areas R. In other embodiments, the optical modulation layers 180 located at least overlapping or totally within the reflective areas R can also be disposed on the second substrate 130 and located between the liquid crystal layer 150 and the optical compensation film 140, and the common electrode 134, for example, covers the optical modulation layers 180.

Figure 2A:
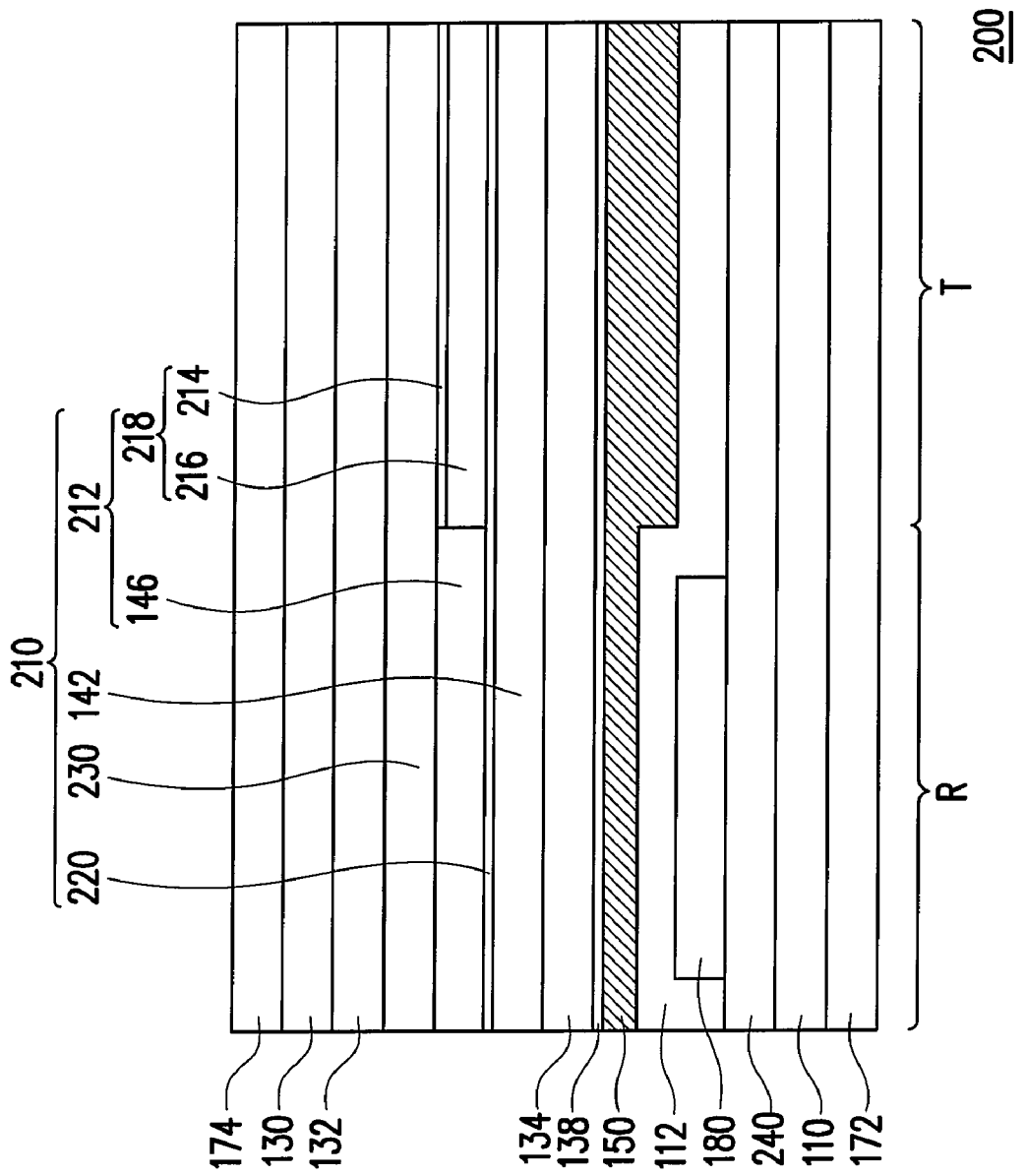
FIG. 2A is a diagram of an LCD panel according to another embodiment of the present invention.

FIG. 2A is a diagram of an LCD panel according to another embodiment of the present invention. Referring to FIG. 2A, the LCD panel 200 is similar with the LCD panel 100 except that the retardation film 212 of the optical compensation film 210 in the LCD panel 200 further includes an alignment-defining layer 214 disposed over partial areas of the optical film 142. The orientation of the partial liquid crystal material 216 located between the alignment-defining layer 214 and the optical film 142 is adjusted by the alignment-defining layer 214. Thus, the alignment-defining layer 214 and the partial liquid crystal material 216 are able to provide a second planar retardation (Ro2). Meanwhile, the thickness of the alignment-defining layer 214 is, for example, about from 0.05 μm to 0.3 μm, and preferably about from 0.05 μm to 0.2 μm. The optical compensation film 210 further includes a protection layer 220 disposed between the retardation film 212 and the optical film 142.

In the optical compensation film 210, the orientation of the liquid crystal material 216 located between the alignment-defining layer 214 and the optical film 142 is adjusted by the alignment-defining layer 214, so that a second retarder 218 provides a specific planar retardation (Ro2), for example, about 0 nm-10 nm. Additionally, in the embodiment, the planar retardation (Ro1) provided by the first retarder 146 is about from 120 nm±3 nm to 160 nm±3 nm, and preferably about 120 nm±3 nm to 140 nm±3 nm. In this way, the retardation film 212 is able to provide different compensation effects for the transmissive areas T and the reflective areas R of the LCD panel 200. In other words, the layout of disposing the retardation film 212 and the optical film 142 is helpful to enhance the brightness of the reflective areas R and the contrast ratio of the transmissive areas T.

The optical compensation film 210 further includes a λ/2 retardation film 230, wherein the retardation film 212 is located, for example, between the λ/2 retardation film 230 and the optical film 142. In this way, the displayed image of the reflective areas R has better color saturation to further enhance the display quality of the LCD panel 200. However, the present invention does not limit to dispose the λ/2 retardation film 230 to increase the saturation of the reflective areas R. In other embodiments, the color saturation of the reflective areas R in the transflective pixel structures 112 arranged in array is able to be enhanced by adjusting the process parameters for forming the retardation film 212, for example, temperature or thickness.

Figure 2B:
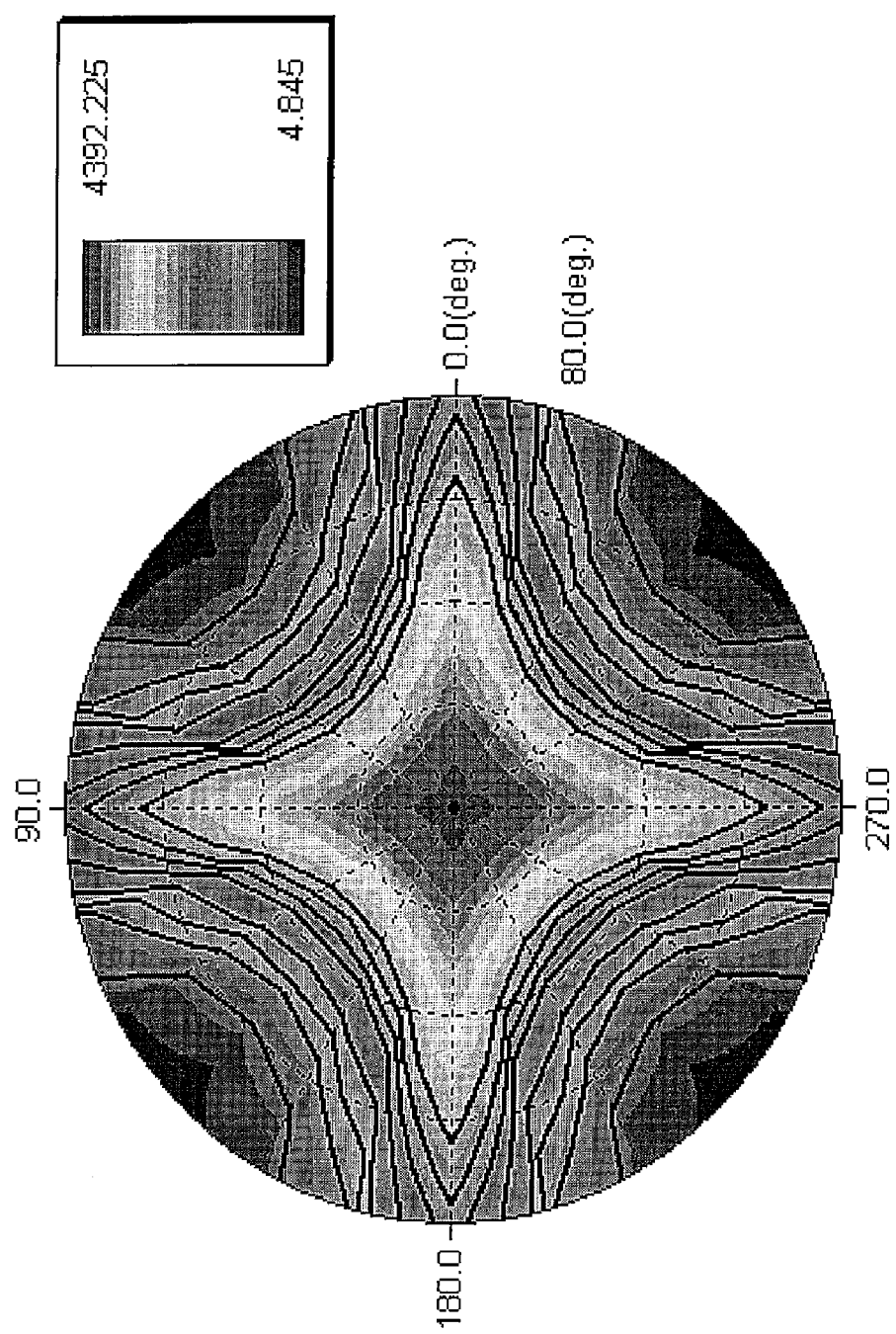
FIG. 2B shows the contrast ratio of the transmissive areas T of the LCD panel 200.

Moreover, the LCD panel 200 can further include a second negative C-plate 240 disposed on the first substrate 110 and located between the first substrate 110 and the pixel structures 112. The second negative C-plate 240 is helpful to widen the viewing angle of the transmissive areas T of the LCD panel 200. FIG. 2B shows the contrast ratio of the transmissive areas T of the LCD panel 200. As shown in FIG. 2B, the second negative C-plate 240 enables the transmissive areas T to have wider viewing angle.

In the following, the fabricating method of optical compensation film according to an embodiment of the present invention is further explained. FIGS. 3A-3D are diagrams showing the fabricating method of an optical compensation film 210 of the present invention. The fabrication method includes following steps.

First referring to FIG. 3A, a substrate 300 is provided and a plurality of alignment-defining layers 214 are formed on partial areas of the substrate 300. The substrate 300 is, for example, a color filter or a glass substrate, and, for example, an alignment layer 302 is formed on the substrate 300. In more detail, the step of forming the alignment-defining layers 214 on the substrate 300 is to form liquid crystal material on the substrate 300. The method of forming the liquid crystal material includes slot-die coating or spin coating. Next, a photo-curing process using a halftone mask in a first temperature is performed to cure the liquid crystal material located on partial areas of the substrate 300. Then, the incured and partial liquid crystal material is removed to form the alignment-defining layers 214, wherein the thickness of the alignment-defining layer 214 is about from 0.05 μm to 0.3 μm, and preferably from 0.05 μm to 0.2 μm.

During the photo-curing process, the first temperature can be about from 50° C. to 150° C., and the material of the alignment-defining layer 214 can be nematic liquid crystal or sematic liquid crystal. If, for example, the nematic liquid crystal is used to make the alignment-defining layer 214, the first temperature can be about 90° C. At the time, the liquid crystal material has isotropic orientation in the first temperature and the orientation thereof is not varied with the orientation of the alignment layer 302; thus, after the liquid crystal material is cured by using the photo-curing process in the first temperature, the alignment-defining layer 214 has isotropic orientation.

Referring to FIG. 3B, the material layer 310 is formed (e.g. coated entirely) on the substrate 300 to cover the substrate 300 and the alignment-defining layers 214. The material of the material layer 310 is, for example, liquid crystal material, and the method of forming the material layer 310 is, for example, slot-die coating or spin coating.

Figure 3C:
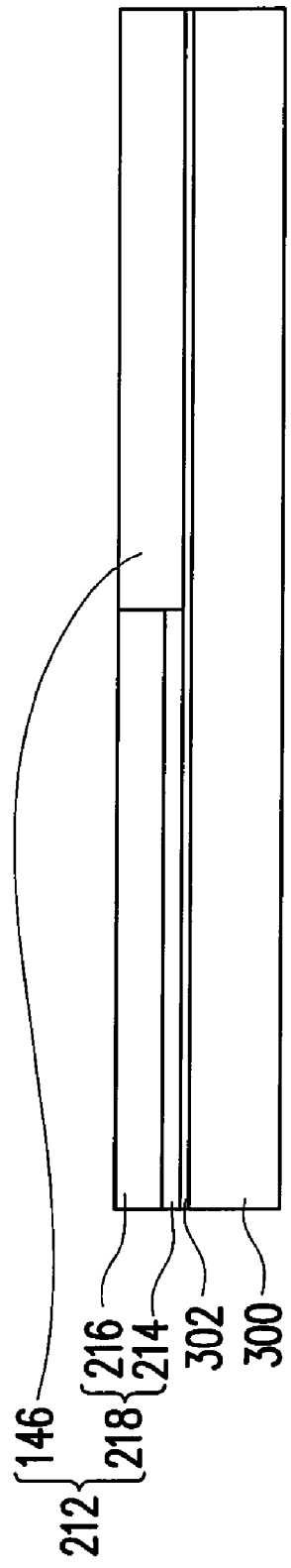

Referring to FIGS. 3B and 3C, the material layer 310 is cured to form the retardation film 212 as sown by FIG. 3C. The method of curing the material layer 310 is, for example, performing another photo-curing process in a second temperature different from the first temperature, wherein the second temperature is, for example, about from 20° C. to 90° C. Note that the photo-curing process in the step would entirely cure the material layer 310 on the substrate 300 without a halftone mask.

In more detail, if the liquid crystal material used for forming the material layer 310 is nematic liquid crystal, the liquid crystal molecules of the material layer 310 would be anisotropically arranged in a second temperature, for example, about 20° C. Accordingly, the partial material layer 310 directly contacting the alignment layer 302 would have a same orientation as the alignment layer 302 in the second temperature, and the partial material layer 310 would constitute the first retarder 146 after curing. Meanwhile, the liquid crystal material 216 located on the alignment-defining layers 214 would have the same orientation as the alignment-defining layers 214, and the liquid crystal material 216 and the alignment-defining layers 214 together constitute the second retarder 218. In this way, the retardation film 212 includes a plurality of first retarders 146 and a plurality of second retarders 218 (only one of the first retarders 146 and one of the second retarders 218 are shown in the figure). Note that the first temperature and the second temperature can be adjusted depending on the type and the characteristic of the liquid crystal material, so that the liquid crystal material in different areas has different orientation to form the retardation film 212.

Figure 3D:
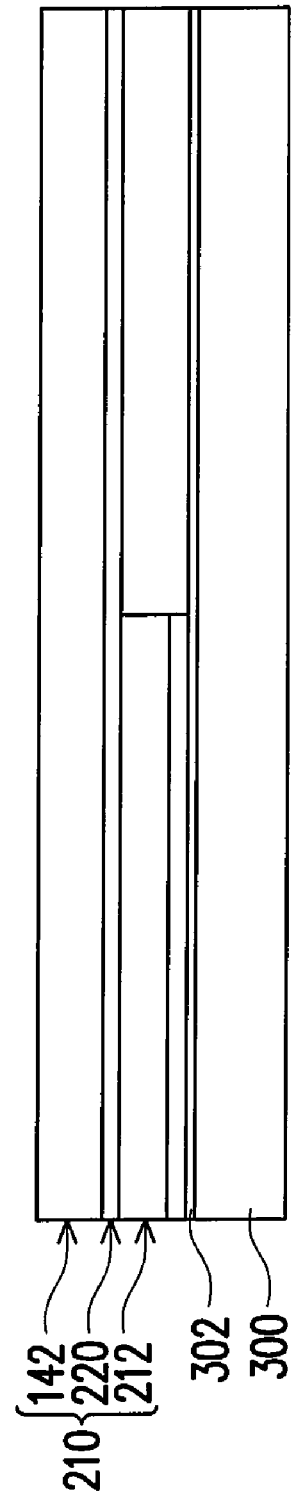

Furthermore referring to FIG. 3D, an optical film 142 is formed on the retardation film 212, wherein the method of forming the optical film 142 includes forming a negative C-plate on the retardation film 212. In addition, prior to forming the optical film 142, the method further includes forming a protection layer 220 on the retardation film 212 to make the optical film 142 isolated from the retardation film 212. The material of the protection layer 220 is, for example, polymer or organic material. In FIG. 3D, the optical compensation film 210 in the embodiment is almost fabricated. In order to farther enhance the compensation effect of the optical compensation film 210, prior to forming the retardation film 212, a λ/2 retardation film can be formed on the substrate 300 (as shown by the λ/2 retardation film in FIG. 2A), which is located between the retardation film 212 and the substrate 300.

Referring to FIG. 3D, the liquid crystal materials of the first retarders 146 and the second retarders 218 in the optical compensation film 210 have different orientations, so that the first retarders 146 and the second retarders 218 have different optical behaviors. Thus, by disposing the retardation film 212 in the LCD panel, different optical compensation effects for different areas are provided. In addition, the fabricating method of optical compensation film of the embodiment, wherein the optical compensation film 210 is formed by coating and photo-curing, can be integrated into the fabricating process of an LCD panel. In comparison with the fabricating process of optical compensation film by laminating and pasting, the fabricating method of the present invention has higher production yield and throughput. Additionally, the overall thickness and volume of the LCD panel can be significantly reduced.

Figure 4C:
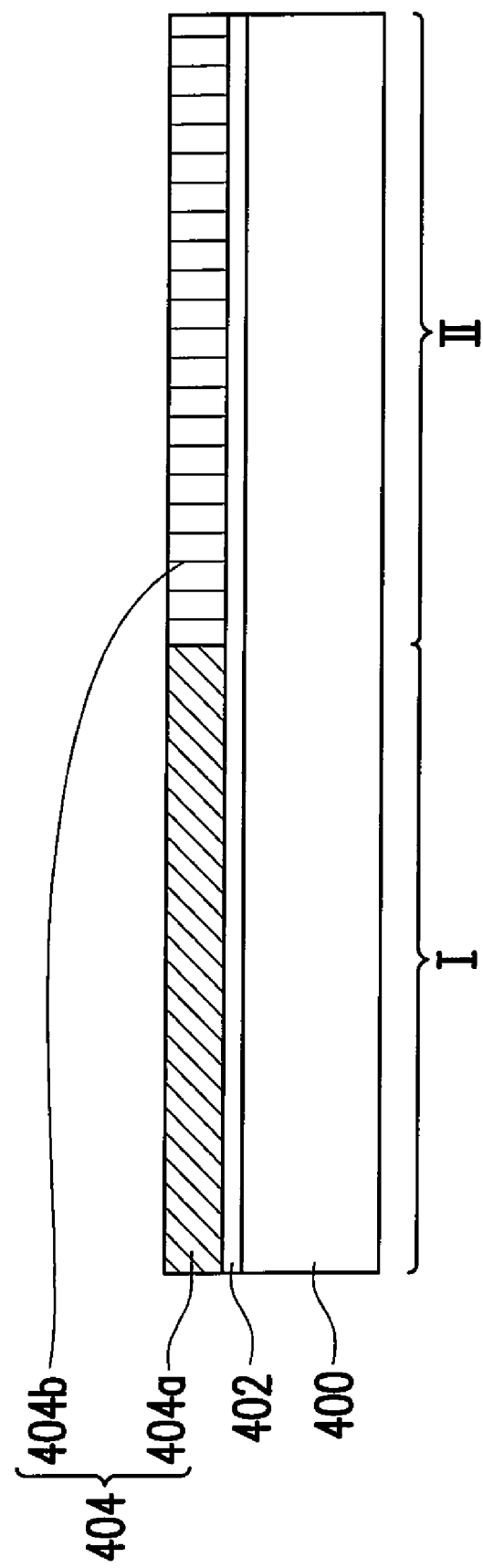

Besides, the present invention also provides other manners to fabricate the optical compensation film having different planar retardations for different areas. For example, FIGS. 4A-4C are diagrams showing the fabricating method of optical compensation film according to another embodiment of the present invention. First referring to FIG. 4A, a substrate 400 is provided, wherein the substrate 400 has, for example, an alignment layer 402 formed thereon. Then, a material layer 404 is formed (e.g. coated) on the substrate 400, following by curing the material layer 404. In the embodiment, the material of the material layer 404 may be liquid crystal material, while the material of the substrate 400 is, for example, glass substrate or color filter.

In more detail, the step of curing the material layer 404 can be first performing a photo-curing process by means of a halftone mask in a first temperature (as shown by FIG. 4B). The halftone mask allows partial light to pass through but blocks the other light to pass. Thus, after the light passes through the halftone mask, the light irradiates a first area I but fails to irradiate a second area II. The partial material layer 404a located on the first area I would be cured in the first temperature and the liquid crystal material thereof has a first orientation. After curing the material layer 404a of the first area I, the cured material layer is able to provide a predetermined planar retardation.

Referring to FIG. 4C, a photo-curing process in a second temperature is performed to fully cure the material layer 404 on the substrate 400. The second temperature enables the liquid crystal material of the partial material layer 404b of the second area II to have a second orientation. After curing the material layer 404b of the second area II, the cured material layer is able to provide a predetermined planar retardation. In this way, the optical compensation film 406 is able to provide different planar retardations for the first area I and the second area II by adjusting the first temperature and the second temperature. Accordingly, the optical compensation film 406 is able to have different optical compensation effects for different areas. The partial material layer 404a located in the first area I can constitute, for example, the first retarders or the second retarders, while the partial material layer 404b located in the second area II can constitute another retarders other than the ones corresponding to the partial material layer 404a.

In summary, the optical compensation film, the fabricating method thereof and the LCD panel using the same of the present invention have at least following advantages:

1. The optical compensation film of the present invention has different planar retardations in different areas, which is used to provide different compensations for the different areas of an LCD panel.

2. The optical compensation film of the present invention enables the reflective areas of the LCD panel to have higher brightness and the transmissive areas to have higher contrast ratio.

3. The optical compensation film of the present invention is capable of providing good compensation effect to the LCD panel by using fewer optical film layers.

4. The fabricating method of optical compensation film of the present invention can be integrated into an, LCD panel process, therefore, the present invention is able to avoid an increasing panel thickness and the process complexity caused by laminating and pasting the plurality of optical compensation films in the prior art.

It will be apparent to those skilled in the art that various modifications and variations can be made to the structure of the present invention without departing from the scope, or spirit of the invention. In view of the foregoing, it is intended that the present invention cover modifications and variations of this invention provided they fall within the scope of the following claims and their equivalents. In addition, any one of the embodiments of the present invention or any one of the claims is not necessarily to achieve all the objectives, all the advantages or all the features disclosed by the present invention. Moreover, the abstract of the disclosure and the title are intended to aid paten searching, not to limit the claim scope of the present invention.

What is claimed is:

1. An optical compensation film, comprising:
an optical film for providing a plate retardation in the direction of thickness; and
a retardation film, disposed on the optical film, comprising a first retarder and a second retarder, the first retarder having an anisotropic orientation and the second retarder having an isotropic orientation, wherein the first retarder is disposed on an area of the optical film and provides a first planar retardation, the second retarder is disposed on another area of the optical film but located outside the first retarder and provides a second planar retardation, and the first planar retardation is physically different from the second planar retardation.

2. The optical compensation film according to claim 1, wherein the plate retardation is approximately from 130 nm±6 nm to 220 nm±6 nm.

3. The optical compensation film according to claim 1, wherein the first planar retardation is approximately from 120 nm±3 nm to 160 nm±3 nm and the second planar retardation is approximately from 0 nm to 10 nm.

4. The optical compensation film according to claim 1, wherein the optical film is a negative C-plate.

5. The optical compensation film according to claim 1, wherein a material of the optical film comprises liquid crystal material.

6. The optical compensation film according to claim 1, wherein a material of the retardation film comprises liquid crystal material.

7. The optical compensation film according to claim 6, wherein the retardation film further comprises an alignment-defining layer disposed over at least partial areas of the optical film and a thickness of the alignment-defining layer is approximately from 0.05 m to 0.3 m.

8. The optical compensation film according to claim 1, further comprising a protection layer disposed between the retardation film and the optical film.

9. The optical compensation film according to claim 1, further comprising a λ/2 retardation film, wherein the retardation film is located between the λ/2 retardation film and the optical film.

10. A liquid crystal display panel, comprising:
a first substrate, comprising a plurality of transflective pixel structures arranged in array, wherein each of the transflective pixel structures has a transmissive area and a reflective area;
a second substrate, located over the transflective pixel structures of the first substrate, comprising a retardation film, wherein the retardation film comprises a plurality of first retarders and a plurality of second retarders, the first retarders are located at least overlapping the reflective area of each the transflective pixel structure and provide a first planar retardation, the second retarders are located at least overlapping the transmissive area of each the transflective pixel structure and provide a second planar retardation, a material of the retardation film is intrinsically even liquid crystal material, the first retarders have an anisotropic orientation, and the second retarders have an isotropic orientation such that the first planar retardation is physically different from the second planar retardation; and
a liquid crystal layer, disposed between the first substrate and the second substrate.

11. The liquid crystal display panel according to claim 10, wherein the first planar retardation is approximately from 120 nm±3 nm to 160 nm±3 nm and the second planar retardation is approximately from 0 mn to 10 nm.

12. The liquid crystal display panel according to claim 10, wherein the second substrate further comprises an optical film for providing a plate retardation in the direction of thickness, the retardation film is disposed on the optical film, and the plate retardation is approximately from 130 nm±6 nm to 220 nm±6 nm.

13. The liquid crystal display panel according to claim 12, wherein the second substrate further comprises a $\lambda/2$ retardation film, and the retardation film is located between the $\lambda/2$ retardation film and the optical film.

* * * * *